United States Patent
Friedman et al.

(10) Patent No.: US 12,407,766 B2
(45) Date of Patent: Sep. 2, 2025

(54) PAYLOAD DIRECT MEMORY STORING (PDMS) FOR REMOTE DIRECT MEMORY ACCESS (RDMA)

(71) Applicant: Mellanox Technologies, Ltd., Yokneam (IL)

(72) Inventors: Yamin Friedman, Jerusalem (IL); Ariel Shahar, Jerusalem (IL); Idan Borshteen, Karmiel (IL); Roee Moyal, Yokne'am Illit (IL)

(73) Assignee: Mellanox Technologies, Ltd., Yokneam (IL)

( * ) Notice: Subject to any disclaimer, the term of this patent is extended or adjusted under 35 U.S.C. 154(b) by 383 days.

(21) Appl. No.: 17/902,150

(22) Filed: Sep. 2, 2022

(65) Prior Publication Data
US 2024/0080379 A1   Mar. 7, 2024

(51) Int. Cl.
| | |
|---|---|
| *H04L 69/22* | (2022.01) |
| *G06F 13/28* | (2006.01) |
| *G06F 15/167* | (2006.01) |
| *H04L 49/90* | (2022.01) |

(52) U.S. Cl.
CPC ............. *H04L 69/22* (2013.01); *G06F 13/28* (2013.01); *G06F 15/167* (2013.01); *H04L 49/90* (2013.01)

(58) Field of Classification Search
CPC ......... H04L 69/22; H04L 49/90; G06F 13/28; G06F 15/167; G06F 15/17331
See application file for complete search history.

(56) References Cited

U.S. PATENT DOCUMENTS

| | | | |
|---|---|---|---|
| 2006/0075067 A1* | 4/2006 | Blackmore | H04L 69/16 709/217 |
| 2015/0006749 A1* | 1/2015 | Hendel | H04L 47/34 709/230 |
| 2021/0390075 A1* | 12/2021 | Wang | G06F 16/245 |
| 2022/0291976 A1* | 9/2022 | Goel | G06F 9/526 |

* cited by examiner

*Primary Examiner* — Michael A Keller
(74) *Attorney, Agent, or Firm* — Lowenstein Sandler LLP

(57) ABSTRACT

Technologies for payload direct memory storing (PDMS) for out-of-order delivery of packets in remote direct memory access (RDMA) are described. A responder device includes an RDMA transport layer that can receive packets out of order and allow direct data placement of packet data in order. The responder device receives a first packet with a first packet number and first location information. The responder device stores first packet data to a first location according to the first location information. The responder device also receives a second packet and stores second packet data to a second location according to the second location information. A second packet number indicates that the first packet is received out of order. The first and second packet data are stored in order. The responder device can provide an indication that a message has arrived in response to determining that all packets of the message have arrived.

25 Claims, 11 Drawing Sheets

PAYLOAD DIRECT MEMORY STORING (PDMS) FOR REMOTE DIRECT MEMORY ACCESS (RDMA)

TECHNICAL FIELD

At least one embodiment pertains to processing resources used to perform and facilitate network communications. For example, at least one embodiment pertains to remote direct memory access technology, and more specifically, to allow full flexibility in network packet reordering.

BACKGROUND

Remote direct memory access (RDMA) technology enables network adapters to transfer data over a network directly to (or from) memory of a remote device without storing data in data buffers of the operating system of the remote device. Advantages of RDMA include reduced computations and caching by processing devices, e.g., central processing units (CPUs), elimination of the need to copy the data between various network layers, convenient discretization of transmitted data, and so on. RDMA transactions are supported by a number of communication protocols, including RDMA over Converged Ethernet (RoCE), which facilitates RDMA operations using conventional standard Ethernet infrastructure, Internet Wide Area RDMA Protocol (iWARP), which facilitates RDMA operations using Transmission Control Protocol (TCP), and InfiniBand™, which provides native support for RDMA operations. RDMA transactions are especially useful in cloud computing applications and numerous applications that require high data transmission rates and low latency.

BRIEF DESCRIPTION OF DRAWINGS

Various embodiments in accordance with the present disclosure will be described with reference to the drawings, in which.

DETAILED DESCRIPTION

Figure 1:
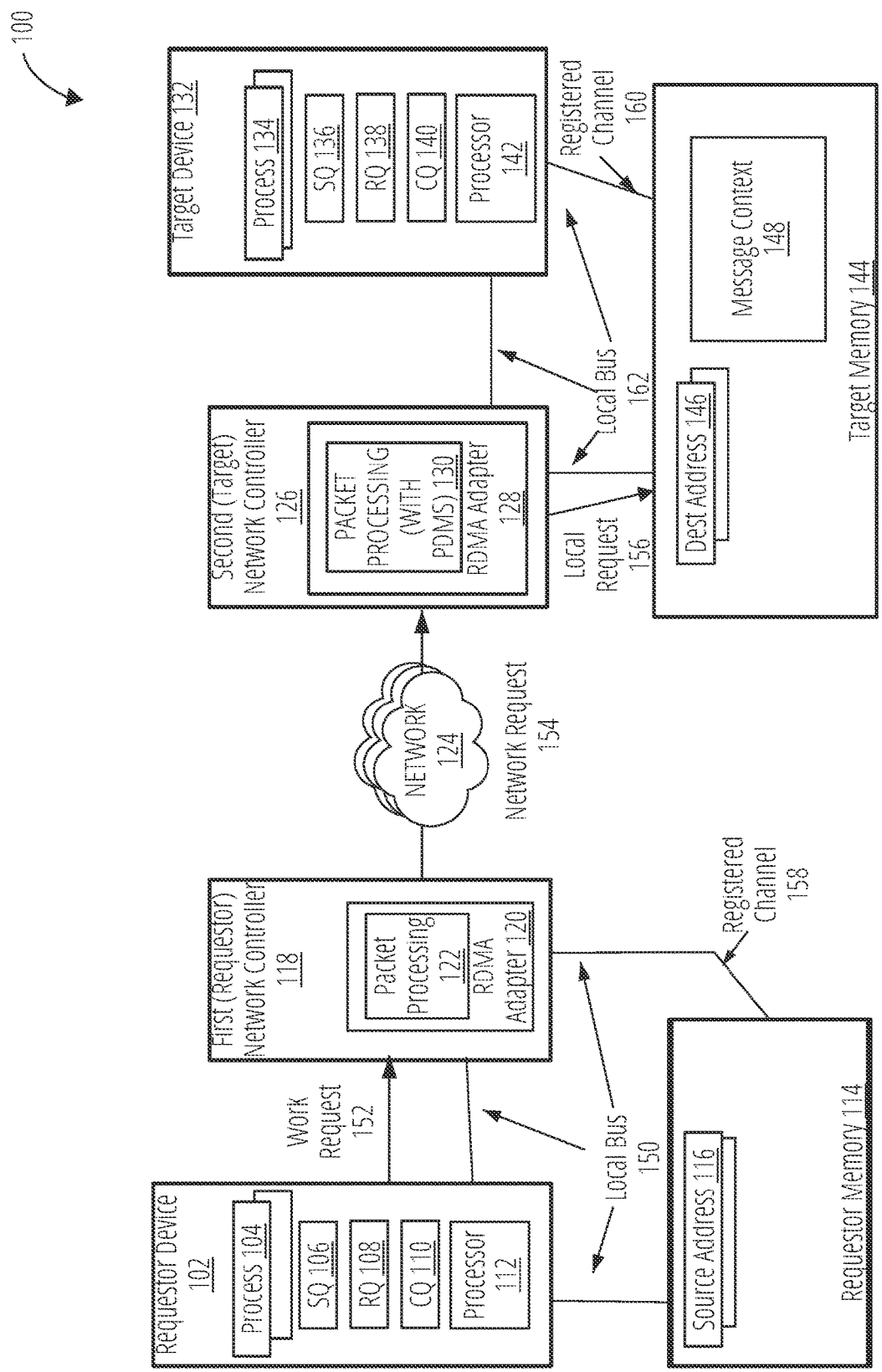
FIG. 1 is a block diagram of an example network architecture capable of payload direct memory storing (PDMS) for out-of-order delivery of packets in RDMA, according to at least one embodiment.

Technologies for payload direct memory storing (PDMS) for out-of-order delivery of packets in RDMA are described. Currently, in RDMA, there is an assumption that all packets for a specific transport flow will travel across the same network path. This is mostly to ensure in-order packet delivery for proper transport operation. This is considered to be too limiting to force the use of a single network path per connection. To gain optimal network utilization, removing the limitations of out-of-order packet delivery in the transport layer is necessary. Currently, there is no mechanism for full RDMA out-of-order packet delivery in the transport layer.

Aspects and embodiments of the present disclosure of PDMS address these and other challenges by providing mechanisms and methods for allowing out-of-order packet delivery in the transport layer by accepting every kind of packet on arrival. Once packets of a message have been accepted, responder resources can be allocated and released once the message is completed. The packet data can be scattered either to memory or data buffers. Aspects and embodiments of the present disclosure of PDMS can scatter RDMA send data out of order, and store RDMA read requests and RDMA ATOMICs in a network interface controller until they can start to be executed. Depending on the exact use case requirements, the message can be completed in or out of order. Aspects and embodiments of the present disclosure of PDMS can provide full flexibility in network packet reordering without defining how packet reordering is implemented. Aspects and embodiments of the present disclosure of PDMS can be based on RDMA over Converged Ethernet (RoCE), InfiniBand, or other similar transport technologies.

Aspects and embodiments of the present disclosure of PDMS can improve network utilization by reducing overhead for the re-transmission of packets that are received out of order. Aspects and embodiments of the present disclosure of PDMS can improve network utilization by allowing packets to be transmitted across multiple network paths and reordered on the target device. Aspects and embodiments of the present disclosure of PDMS can accept all packets regardless of order without any significant bandwidth or message rate degradation. In some cases, additional responder resources can be allocated to support outstanding RDMA send requests, RDMA writes with immediate requests, or the like.

Aspects and embodiments of the present disclosure of PDMS can allow the ability to perform PDMS to be negotiated during a queue pair (QP) connection. A requestor device can limit a total number of outstanding messages to prevent a responder device from resource overflow. For PDMS, it is assumed that the user does not require the receive work queue elements (WQEs) to be consumed in order, or hardware offloads that require in-order data handling are used. A completion queue entry (CQE) is posted only if all packets for the message have arrived and an expected packet sequence number (EPSN) has reached that point. The EPSN is the PSN that the transport layer expects to get next.

When using PDMS, all message opcodes specify that the responder device allocates a responder resource, a message context, except for RDMA write requests. Responder resources used for RDMA send requests and RDMA writes with immediate requests can be released as soon as the message has been completed. Each packet in an RDMA send or RDMA write with immediate can contain a first packet sequential number (PSN) of a message. PDMS can scatter the packet data of the packets into memory or data buffer according to location information in the packets. The first PSN of the message or a message identifier (e.g., a message sequence number (MSN) of the message can be used to identify a message context (responder resource). In another embodiment, a message sequence number could be sent in each packet instead of only using the first PSN, where the message sequence number identifies the message context.

It should be noted that PDMS does not alter any requirements for in-order completion posting. In some cases, the completions must be posted in order once all previous messages have been completed. In the case of RDMA read requests and RDMA ATOMICs, the requests can be stored in a responder database (RDB) and executed only in the correct order. The RDB can store message context information.

In at least one embodiment, each RDMA send request can include a new header field that identifies an offset of a packet within a message. When a first packet for a new RDMA send request arrives at a responder, a receive WQE can be selected for the RDMA send request, and the data for each packet will be scattered to a data buffer as the packet arrives. Once all the packets have arrived, the message can be completed, and a CQE can point to the correct receive WQE. In at least one embodiment, an invalidation portion of an RDMA send and invalidate request can only be executed when the message is completed. In other embodiments, the CQE can store a message identifier (message ID) and message sequence number (MSN) instead of the first and last.

In at least one embodiment, a software interface (software application programming interface (SW API)) can configure a QP to support PDMS. In some cases, PDMS mechanisms can be supported on a per message configuration set in the WQE. In other cases, PDMS mechanisms can be supported per a connection configuration. It should be noted that certain hardware offloads, like signature calculations, are not enabled while using PDMS mechanisms. PDMS mechanisms comply with the InfiniBand specification from a software interface point of view except for the order in which the receive WQEs are consumed. PDMS can be negotiated between two devices before packet reordering is enabled.

Aspects and embodiments of the present disclosure of PDMS are relevant for any networks that provide multiple routes between any two end node devices or where packet drops are possible Aspects and embodiments of the present disclosure of PDMS are relevant for any use case that sends large amounts of data across the network. One example use case includes a network where the end node devices have a higher aggregate bandwidth than individual links in the network. Aspects and embodiments of the present disclosure of PDMS can enable hardware to receive packets out of order without software intervention in the data path. Aspects and embodiments of the present disclosure can enable spreading traffic for a single transport flow on multiple routes transparently to an application.

Aspects and embodiments of the present disclosure can be used in channel adapters, network adapters, network interface cards (NICs), or the like. A channel adapter (CA), whether a network channel adapter or a host channel adapter, refers to an end node in an InfiniBand Network with features for InfiniBand and RDMA, whereas NIC is similar but for an Ethernet network. Network interface controller, also known as a NIC, network adapter, local area network (LAN) adapter, or physical network interface, refers to a computer hardware component that connects a computer to a computer network. The network interface controller can provide interfaces to a host processor, multiple receive and transmit queues for multiple logical interfaces, and traffic processing. The network interface controller can be both a physical layer and data link layer device, as it provides physical access to a networking medium and a low-level addressing system through the use of media access control (MAC) addresses that are uniquely assigned to network interfaces. The technologies described herein can be implemented in these various types of devices and are referred to herein as "network interface controller" or "network controller." That is, the network interface controller can be a channel adapter, a NIC, a network adapter, or the like. The network interface controller can be implemented in a personal computer (PC), a set-top box (STB), a server, a network router, a switch, a bridge, a data processing unit (DPU), a network card, or any device capable of sending packets over multiple network paths to another device.

FIG. 1 is a block diagram of an example network architecture 100 capable of payload direct memory storing (PDMS) for out-of-order delivery of packets in RDMA, according to at least one embodiment. As depicted in FIG. 1, network architecture 100 can support operations of a requestor device 102 connected over local bus 150 to a first network controller 118 (a requestor network controller). The first network controller 118 can be connected, via a network 124, to a second network controller 126 (a target network controller) that supports operations of a target device 132. Network 124 can be a public network (e.g., the Internet), a private network (e.g., a local area network (LAN), or wide area network (WAN)), a wireless network, a personal area network (PAN), or a combination thereof. RDMA operations can support the transfer of data from a requestor memory 114 directly to (or from) a target memory 144 without software mediation by the target device 132.

Requestor device 102 can support one or more applications (not explicitly shown in FIG. 1) that can manage various processes 104 that control data communication with various targets, including target memory 144. To facilitate memory transfers, processes 104 can post work requests (WRs) to a send queue (SQ) 106 and to a receive queue (RQ) 108. SQ 106 can be used to request one-sided READ, WRITE, and ATOMIC operations as well as two-sided SEND operations, while RQ 108 can be used to facilitate two-sided RECEIVE requests. Similar processes 134 can operate on target device 132 that supports its own SQ 136 and RQ 138. A connection between requestor device 102 and target device 132 bundles SQs and RQs into queue pairs (QPs), e.g., SQ 106 (or RQ 108) on requestor device 102 is paired with RQ 138 (or SQ 136) on the target device 132. More specifically, to initiate a connection between requestor device 101 and target device 132, the processes 104 and 134 can create and link one or more queue pairs.

To perform a data transfer, process 104 creates a work queue element (WQE) that specifies parameters such as the RDMA verb (operation) to be used for data communication and also can define various operation parameters, such as a source address 116 in a requestor memory 114 (where the data is currently stored), a destination address 146 in a target memory 144, and other parameters, as discussed in more detail below. Requestor device 102 can then put the WQE into SQ 106 and send a WR 152 to the first network controller 118, which can use an RDMA Adapter 120 to perform packet processing 122 of the WQE and transmit the data indicated in source address 116 to the second network controller 126 via network 124 using a network request 154. An RDMA Adapter 128 can perform packet processing 130 with PDMS of the received network request 154 (e.g., by generating a local request 156) and store the data at a destination address 146 of target memory 144. Subsequently, target device 132 can signal a completion of the data transfer by placing a completion event into a completion queue (CQ) 110 of requestor device 102, indicating that the WQE has been processed by the receiving side. Target device 132 can also maintain CQ 140 to receive completion messages from requestor device 102 when data transfers happen in the opposite direction, from the target device 132 to requestor device 102.

Operation of requestor device 102 and target device 132 can be supported by respective processors 112 and 142, which can include one or more processing devices, such as CPUs, graphics processing units (GPUs), application-specific integrated circuits (ASICs), field-programmable gate arrays (FPGAs), or any combination thereof. In some embodiments, any of requestor device 102, the first network controller 118, and/or requestor memory 114 can be implemented using an integrated circuit, e.g., a system-on-chip. Similarly, any of target device 132, the second network controller 126, and/or target memory 144 can be implemented on a single chip. The requestor device 102 and first network controller 118 can be implemented in a personal computer (PC), a set-top box (STB), a server, a network router, a switch, a bridge, a data processing unit (DPU), a network card, or any device capable of sending packets over multiple network paths to another device.

Processors 112 and 142 can execute instructions from one or more software programs that manage multiple processes 104 and 134, SQs 106 and 136, RQs 108 and 138, CQs 110 and 140, and the like. For example, software program(s) running on requestor device 102 can include host or client processes, a communication stack, and a driver that mediates between requestor device 102 and first network controller 118. The software program(s) can register direct channels of communication with respective memory devices, e.g., RDMA software programs running on requestor device 102 can register a direct channel 158 of communication between the first network controller 118 and requestor memory 114 (and, similarly, a direct channel 160 of communication between the second network controller 126 and target memory 144). Registered channels 158 and 160 can then be used to support direct memory accesses to the respective memory devices. In the course of RDMA operations, the software program(s) can post WRs, repeatedly check for completed WRs, balance workloads among the multiple RDMA operations, balance workload between RDMA operations and non-RDMA operations (e.g., computations and memory accesses), and so on. The requestor device 102 and first network controller 118 can be implemented in a personal computer (PC), a set-top box (STB), a server, a network router, a switch, a bridge, a data processing unit (DPU), a network card, or any device capable of sending packets over multiple network paths to another device.

RDMA accesses to requestor memory 114 and/or target memory 144 can be performed via network 124, local bus 150 on the requestor side, and bus 162 on the target side and can be enabled by the RoCE protocol, iWARP protocol, and/or IBoE, TCP, and the like.

As disclosed in more detail below, the second network controller 126 can receive a first packet of a message in a single RDMA transport stream from the requestor device 102. The first packet includes a first packet number (also referred to as a first packet value) and first location information. The second network controller 126 stores first packet data of the first packet to a first location in a message context 148 according to the first location information. The message context 148 can be stored in target memory 144 or in memory, cache, or storage in the second network controller 126. The second network controller 126 can receive a second packet of the message. The second packet includes a second packet number (also referred to as a second packet value) and second location information. The second packet number indicates that the first packet is received out of order relative to the second packet. The second network controller 126 stores second packet data of the second packet to a second location in the message context according to the second location information. The first and second locations store the first packet data and the second packet data in order. The second network controller 126 can provide an indication that the message has arrived in response to determining that all packets of the message have arrived. The PDMS feature described herein can be set up during session negotiation by a session negotiation mechanism. The PDMS feature can be based on RoCE, Infiniband, or other similar transport technologies.

In at least one embodiment, the requestor device 102 and the first network controller 118 are part of a first node device, and the target device 132 and the second network controller 126 are part of a second node device. Multiple intervening nodes can exist between the first and second node devices.

In at least one embodiment, the message context 148 can maintain or store a list of packets of the message that have successfully arrived. The processing logic can determine that all packets of the message have arrived using the list of packets. In another embodiment, the processing logic can store information about the message and the number of packets to be received. The processing logic can determine that all of the packets of the message have been received using other techniques.

Figure 2:
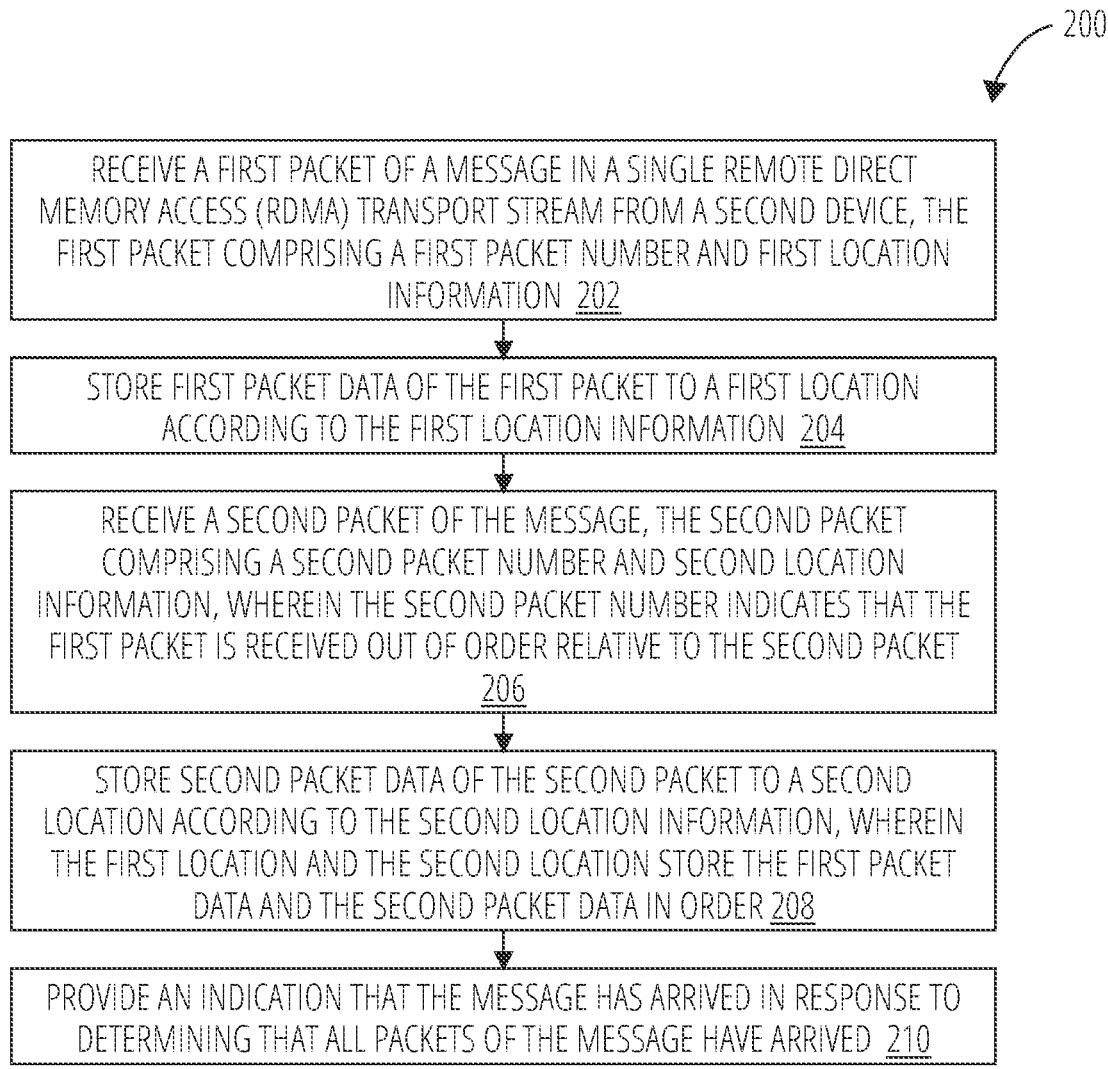
FIG. 2 is a flow diagram of a method for direct data placement of packets received out of order according to at least one embodiment.

FIG. 2 is a flow diagram of a method 200 for direct data placement of packets received out of order according to at least one embodiment. The method 200 can be performed by processing logic comprising hardware, software, firmware, or any combination thereof. In at least one embodiment, the method 200 is performed by the target device 132 of FIG. 1. In at least one embodiment, the method 200 is performed by the requestor device 102 of FIG. 1. In at least one embodiment, the method 200 is performed by the second network controller 126 of FIG. 1. In another embodiment, the first network controller 118 of FIG. 1 performs the method 200. In one embodiment, the method 200 can be programmable by users.

Referring to FIG. 2, the method 200 begins with the processing logic receiving a first packet of a message in a single RDMA transport stream from a second device (block 202). The first packet includes a first packet number and first location information (e.g., PSN). The processing logic stores first packet data of the first packet to a first location according to the first location information (block 204). For example, the processing logic can scatter the first packet data to memory or data buffer. The processing logic receives a second packet of the message (block 206). The second packet includes a second packet number and second location information. The second packet number indicates that the first packet is received out of order relative to the second packet. For example, the first packet number is a higher PSN than the second packet number. The processing logic stores second packet data of the second packet to a second location according to the second location information (block 208). For example, the processing logic can scatter the second packet data to memory or data buffer. The first and second locations store the first packet data and the second packet data in order. The processing logic provides an indication that the message has arrived in response to determining that all packets of the message have arrived (block 210).

In at least one embodiment, the message can be an RDMA send request, an RDMA write request, an RDMA read request, or an RDMA ATOMIC request. In one embodiment, the first and second locations are memory locations in a memory. In another embodiment, the first and second locations are locations in a data buffer.

In at least one embodiment, the message is an RDMA send request. In this case, the first packet includes a header field with the first location information. The first location information can identify an offset of the first packet within the message. The second packet header can include a header field with the second location information that identifies an offset of the second packet within the message.

In another embodiment, the first packet is received from the requestor device 102 over a first route between the requestor device 102 and the target device 132. The second packet is received from the requestor device 102 over a second route between the requestor device 102 and the target device 132. The first route and the second route are different.

In at least one embodiment, the processing logic maintains a list of packets of the message that have successfully arrived. The processing logic can determine that all packets of the message have arrived using the list of packets.

In a further embodiment, the processing logic receives a third packet of the message from the requestor device. The third packet can be the first in the message. That is, the third packet is received before the first packet and the second packet. The third packet includes a first PSN of the message. The first PSN can identify a message context of the message. In another embodiment, the third packet (and the first and second packets) can include a message sequence number instead of using only the first PSN.

In a further embodiment, the processing logic selects a WQE in a data buffer for the message in response to receiving the third packet. The message is for an RDMA send request. The first location information identifies a first offset of the first packet data within the message, and the second location information identifies a second offset of the second packet data within the message. The processing logic scatters the first packet data to the data buffer according to the first offset and scatters the second packet data to the data buffer according to the second offset. The processing logic updates a completion status of a CQE associated with the WQE.

Figure 3:
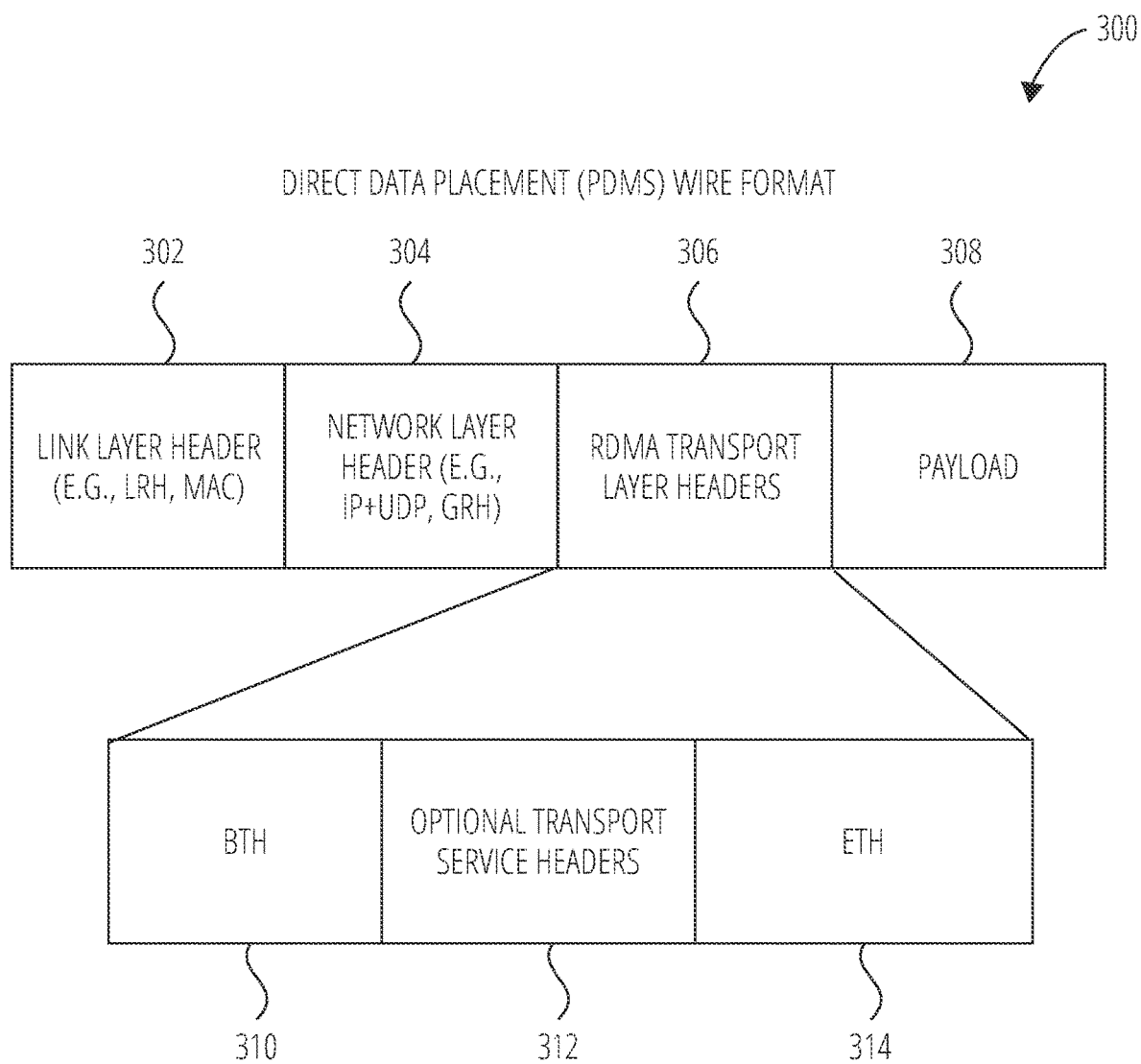
FIG. 3 is a diagram illustrating an example RDMA packet according to at least one embodiment.

In at least one embodiment, to permit out-of-order delivery, a requestor device can include a new header field in the RDMA transport layer headers that identify location of the packet within the message (e.g., an offset of a packet within the message), such as illustrated in FIG. 3.

FIG. 3 is a diagram illustrating an example RDMA packet 300 according to at least one embodiment. The RDMA packet 300 includes a link layer header 302, a network layer header 304, an RDMA transport layer 306, and a payload 308. The link layer header 302 can include one or more fields with link layer information, such as a local route header (LRH) for routing inside the same subnet, message access control (MAC) addresses, or the like. The network layer header 304 can include one or more fields with network layer information, such as a global route header (GRH) for routing cross subnets, IP addresses, user datagram protocol (UDP), or the like. The RDMA transport layer 306 can include one or more fields with transport layer information, such as a basic transport header (BTH) 310, optional transport service headers 312, an extended transport header (ETH) 314 (e.g., Send ETH), or the like. The transport headers identify the data for a particular transmission stream. A transport header contains information for managing and controlling the data stream. The BTH 310 can be used for partition key (PKey) and Destination QP. The ETH 314 can include the definition of the datagram, an RDMA operation type, an acknowledgment request of RDMA operation, etc. The payload 308 can support a maximum transfer unit (MTU), such as 4 KB. Users can define the MTU size under 4 KB according to the application's payload. The larger MTU can get better bandwidth, and the smaller MTU size can get better latency. When the application message is transferred in an RDMA network, the message needs to be decapsulated to the payload under the size of MTU on the transmit side and encapsulated from the payload to the message on the receive side. For an InfiniBand packet, the specification defines the use of GRH for the routing cross subnet and LRH for the routing inside the same subnet. For a RoCE packet, the specification defines the use of InfiniBand BTH and payload as the payload of RoCE, use the InfiniBand (IB) transport layer to guarantee the data reliability from hardware instead of TCP, which is a software-based mechanism. The RoCE payload can use the UDP port to connect to the IP header. RoCEv2 can support the routing across different subnets, and RoCE can support the routing within the same subnet. In at least one embodiment, information to facilitate PDMS can be included in the transport headers, such as in the ETH 314. In at least one embodiment, a packet includes a transport header with a header field with location information identifying an offset of the packet within a message. The responder device can use the location information to scatter the payload 308 to a specific memory location or a specific location in a data buffer relative to other packets of the message. In this matter, the responder device can receive all packets regardless of the order of arrival.

In one aspect, a first device includes a memory or data buffer to store packet data. The first device also includes a processing device coupled to the memory or data buffer. The processing device can receive and accept packets of a message in a single RDMA transport stream regardless of an order of receipt of the packets. The processing device can store packet data of the packets in the order in the memory or data buffer using offset information included in the packets. The processing device can provide an indication that the message has arrived in response to determining that all packets of the message have arrived. The first device can be a network adapter, a NIC, or the like. The processing device can include a transport layer that can provide the indication to a higher layer than the transport layer. The processing device can receive a first packet with a first PSN and a first offset within the message. The processing device can receive a second packet with a second PSN and a second offset within the message. In this case, the first PSN is higher than the second PSN. The processing device can store first packet data of the first packet and second packet data of the second packet in the memory or data buffer in order using the first offset and the second offset, respectively.

In a further embodiment, the first packet is received from a second device over a first route between the first device and the second device, and the second packet is received from the second device over a second route between the first device and the second device. The first route and the second route are different.

In one aspect, a communication system includes a requestor device and a responder device. The communication system also includes responder memory coupled to the responder device. The responder device can receive a first packet of a message in a single RDMA transport stream from the requestor device, the first packet including a first packet number and first location information. The responder device can store first packet data of the first packet to a first location in the responder memory according to the first location information. The responder device can receive a second packet of the message, the second packet including a second packet number and second location information. The second packet number indicates that the first packet is received out of order relative to the second packet. In at least one embodiment, the first packet number is a higher PSN than the second packet number. The responder device can store second packet data of the second packet to a second location in the responder memory according to the second location information. The first and second locations can store the first packet data and the second packet data in order. The responder device can provide an indication that the message has arrived in response to determining that all packets of the message have arrived.

In at least one embodiment, the message is an RDMA send request, and the first packet includes a header field with the first location information. The first location information can identify an offset of the first packet within the message. In other embodiments, the message can be an RDMA send request, an RDMA write request, an RDMA read request, an RDMA ATOMIC request, or the like. Example packet sequences where at least one packet is received out of order are illustrated and described below with respect to FIG. 4 to FIG. 8.

Figure 4:
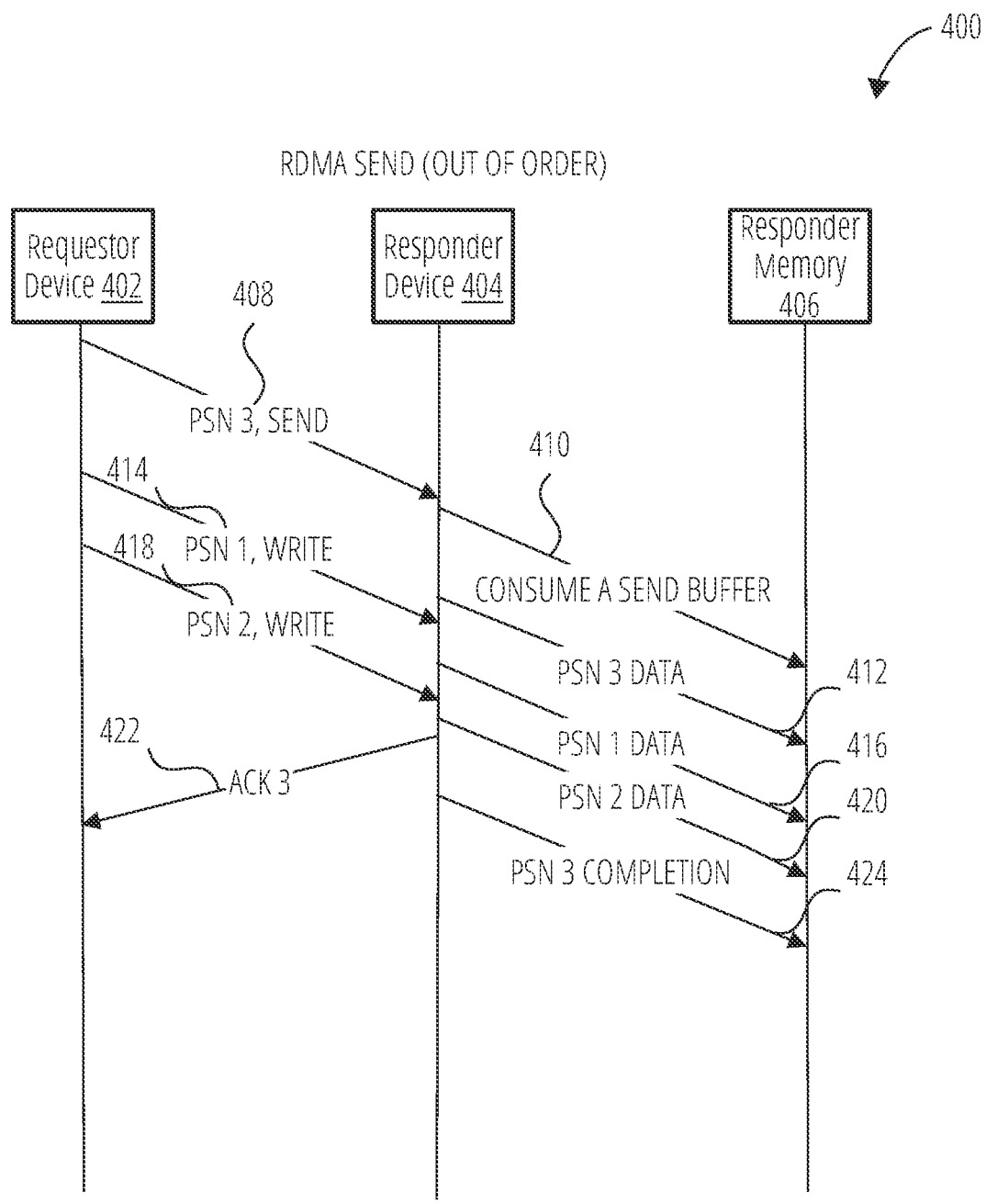
FIG. 4 is a sequence diagram of a packet sequence in which an RDMA SEND request arrives out of order, according to at least one embodiment.

FIG. 4 is a sequence diagram of a packet sequence 400 in which an RDMA SEND request 408 arrives out of order, according to at least one embodiment. The packet sequence 400 shows the data flow between a requestor device 402, a responder device 404, and responder memory 406. The requestor device 402 sends all packets in the correct order, but the packets may not necessarily arrive in order, as illustrated in FIG. 4. As illustrated, the responder device 404 receives the RDMA SEND request 408 from the requestor device 402. The RDMA SEND request 408 includes third packet data (PSN 3 data) and a PSN of 3, indicating that the RDMA SEND request 408 is received out of order. Upon the arrival of the RDMA SEND request 408, the responder device 404 can consume the RDMA SEND request 408 and send buffer information to responder memory 406 (operation 410). The responder device 404 can also send third packet data (PSN 3 data) to the responder memory 406 (operation 412). The responder device 404 does not reject the RDMA SEND request 408 even though it arrives out of order.

Subsequently, the responder device 404 receives an RDMA WRITE request 414 (labeled PSN 1, WRITE). The RDMA WRITE request 414 includes first packet data (PSN 1 data) and a PSN of 1. Upon the arrival of the RDMA SEND request 408, the responder device 404 can send the first packet data (PSN 1 data) to the responder memory 406 (operation 416).

Subsequently, the responder device 404 receives an RDMA WRITE request 418 (labeled PSN 2, WRITE). The RDMA WRITE request 418 includes second packet data (PSN 2 data) and a PSN of 2. Upon the arrival of the RDMA SEND request 418, the responder device 404 can send the second packet data (PSN 2 data) to the responder memory 406 (operation 420). The responder device 404 can determine that all packets of a message, containing the three packets, have been received. At this point, the responder device 404 can send an acknowledgment (ACK) 422 (ACK 3) of the RDMA SEND request 408 back to the requestor device 402 instead of at the point of arrival of the RDMA SEND request 408 since the RDMA SEND request 408 arrived out of order. The responder device 404 can send an indication of completion 424 to the responder memory 406.

Figure 5:
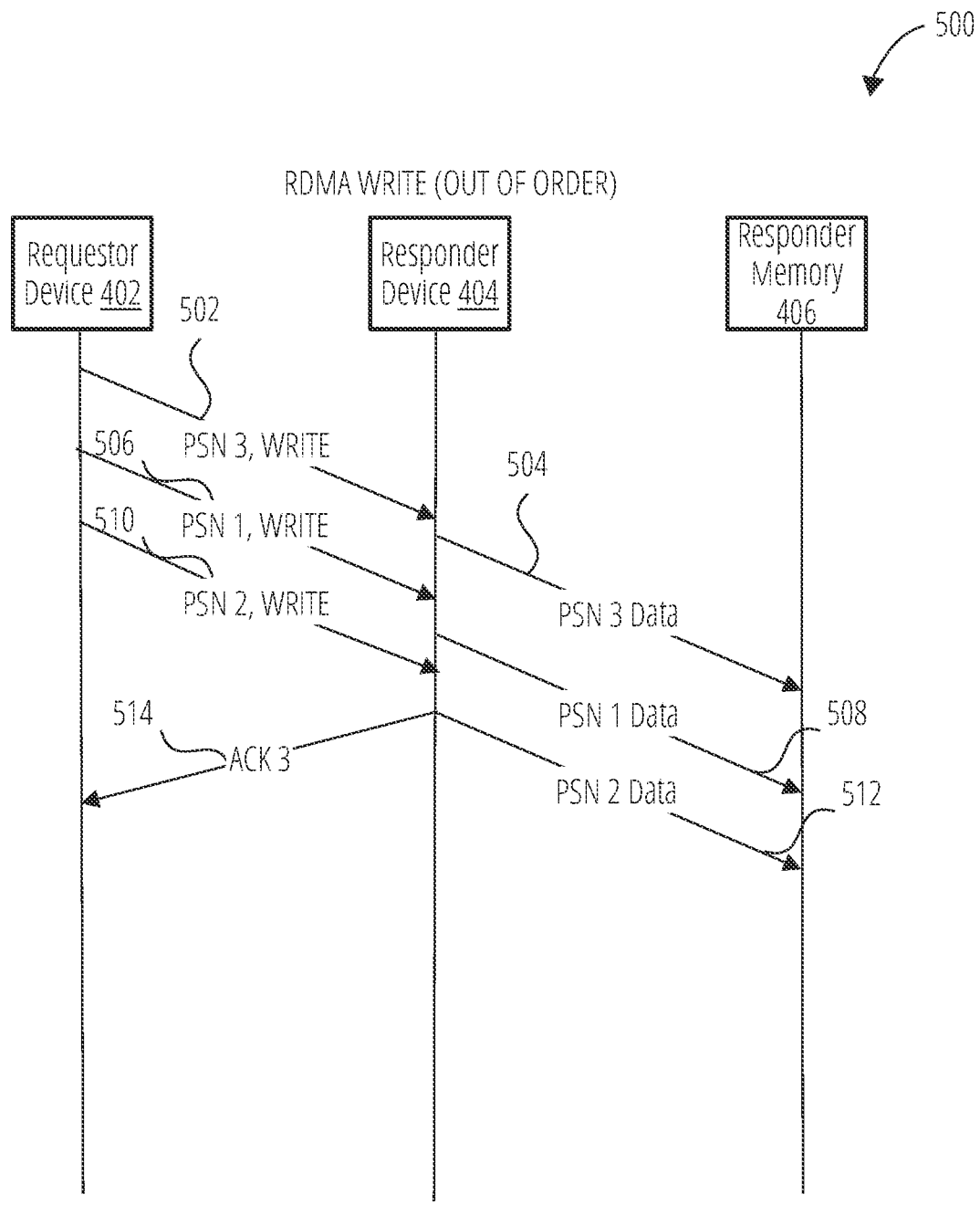
FIG. 5 is a sequence diagram of a packet sequence in which an RDMA WRITE request arrives out of order, according to at least one embodiment.

FIG. 5 is a sequence diagram of a packet sequence 500 in which an RDMA WRITE request arrives out of order, according to at least one embodiment. The packet sequence 500 shows the data flow between the requestor device 402, the responder device 404, and the responder memory 406. The requestor device 402 sends all packets in the correct order, but the packets may not necessarily arrive in order, as illustrated in FIG. 5. As illustrated, the responder device 404 receives the RDMA WRITE request 502 to the responder device 404. The RDMA WRITE request 502 includes third packet data (PSN 3 data) and a PSN of 3, indicating that the RDMA WRITE request 502 is received out of order. Upon the arrival of the RDMA WRITE request 502, the responder device 404 can send the third packet data (PSN 3 data) to the responder memory 406 (operation 504). The responder device 404 does not reject the RDMA WRITE request 502 even though it arrives out of order.

Subsequently, the responder device 404 receives an RDMA WRITE request 506 (labeled PSN 1, WRITE). The RDMA WRITE request 506 includes first packet data (PSN 1 data) and a PSN of 1. Upon the arrival of the RDMA WRITE request 506, the responder device 404 can send the first packet data (PSN 1 data) to the responder memory 406 (operation 508).

Subsequently, the responder device 404 receives an RDMA WRITE request 510 (labeled PSN 2, WRITE). The RDMA WRITE request 510 includes second packet data (PSN 2 data) and a PSN of 2. Upon the arrival of the RDMA WRITE request 510, the responder device 404 can send the second packet data (PSN 2 data) to the responder memory 406 (operation 512). The responder device 404 can determine that all packets of a message, containing the three packets, have been received. At this point, the responder device 404 can send an acknowledgment (ACK) 514 (ACK 3) of the RDMA WRITE request 502 back to the requestor device 402 instead of at the point of arrival of the RDMA WRITE request 502 since the RDMA WRITE request 502 arrived out of order.

Figure 6:
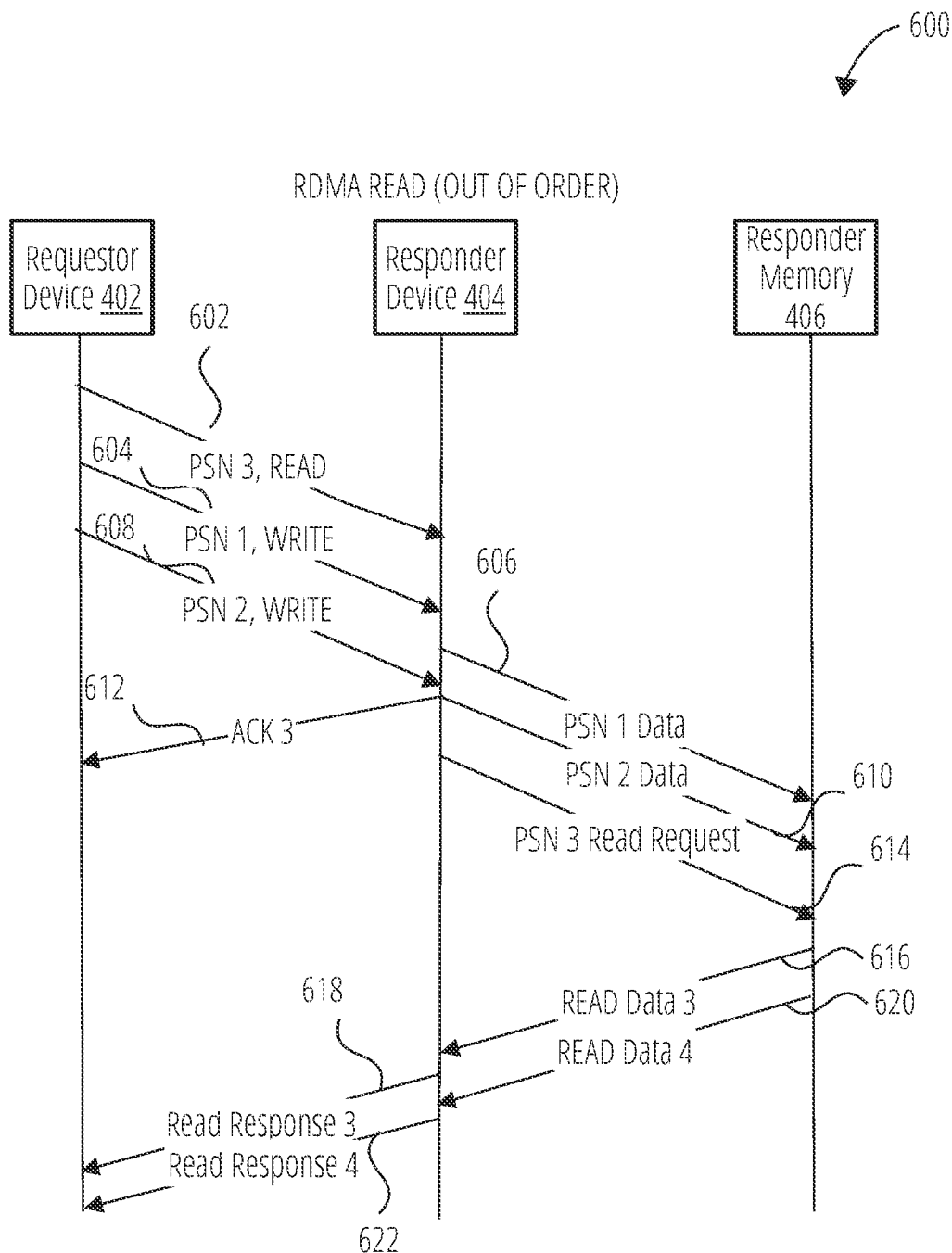
FIG. 6 is a sequence diagram of a packet sequence in which an RDMA READ request arrives out of order, according to at least one embodiment.

FIG. 6 is a sequence diagram of a packet sequence 600 in which an RDMA READ request arrives out of order, according to at least one embodiment. The packet sequence 600 shows the data flow between the requestor device 402, the responder device 404, and the responder memory 406. The requestor device 402 sends all packets in the correct order, but the packets may not necessarily arrive in order, as illustrated in FIG. 6. As illustrated, the responder device 404 receives the RDMA READ request 602 to the responder device 404. The RDMA READ request 602 includes a PSN of 3, indicating that the RDMA READ request 602 is received out of order. Upon the arrival of the RDMA READ request 602, the responder device 404 does not send a read request to the responder memory 406 until the first and second packets are received. The responder device 404 does not reject the RDMA READ request 602 even though it arrives out of order.

Subsequently, the responder device 404 receives an RDMA WRITE request 604 (labeled PSN 1, WRITE). The RDMA WRITE request 604 includes first packet data (PSN 1 data) and a PSN of 1. Upon the arrival of the RDMA WRITE request 604, the responder device 404 can send the first packet data (PSN 1 data) to the responder memory 406 (operation 606).

Subsequently, the responder device 404 receives an RDMA WRITE request 608 (labeled PSN 2, WRITE). The RDMA WRITE request 608 includes second packet data (PSN 2 data) and a PSN of 2. Upon the arrival of the RDMA WRITE request 608, the responder device 404 can send the second packet data (PSN 2 data) to the responder memory 406 (operation 610). The responder device 404 can determine that all packets of a message, containing the three packets, have been received. At this point, the responder device 404 can send an acknowledgment (ACK) 612 (ACK 3) of the RDMA READ request 602 back to the requestor device 402 instead of at the point of arrival of the RDMA READ request 602 since the RDMA READ request 602 arrived out of order. After the first packet data and the second packet data have been sent to the responder memory 406, the responder device 404 can send a read request 614 to the responder memory 406 to read third packet data (READ data 3) from the responder memory 406. The responder memory 406 sends the third packet data 616 back to the responder device 404 in response to the request 614. The responder device 404 sends a read response 618 back to the requestor device 402 with the third packet data (READ data 3). In some cases, the read request 614 results in multiple packets being read from the responder memory 406, so the responder memory 406 can send additional read data 620 back to the responder device 404 in response to the read request 614. The responder device 404 can send an additional read response 622 back to the requestor device 402 with the additional read data (READ data 4).

Figure 7:
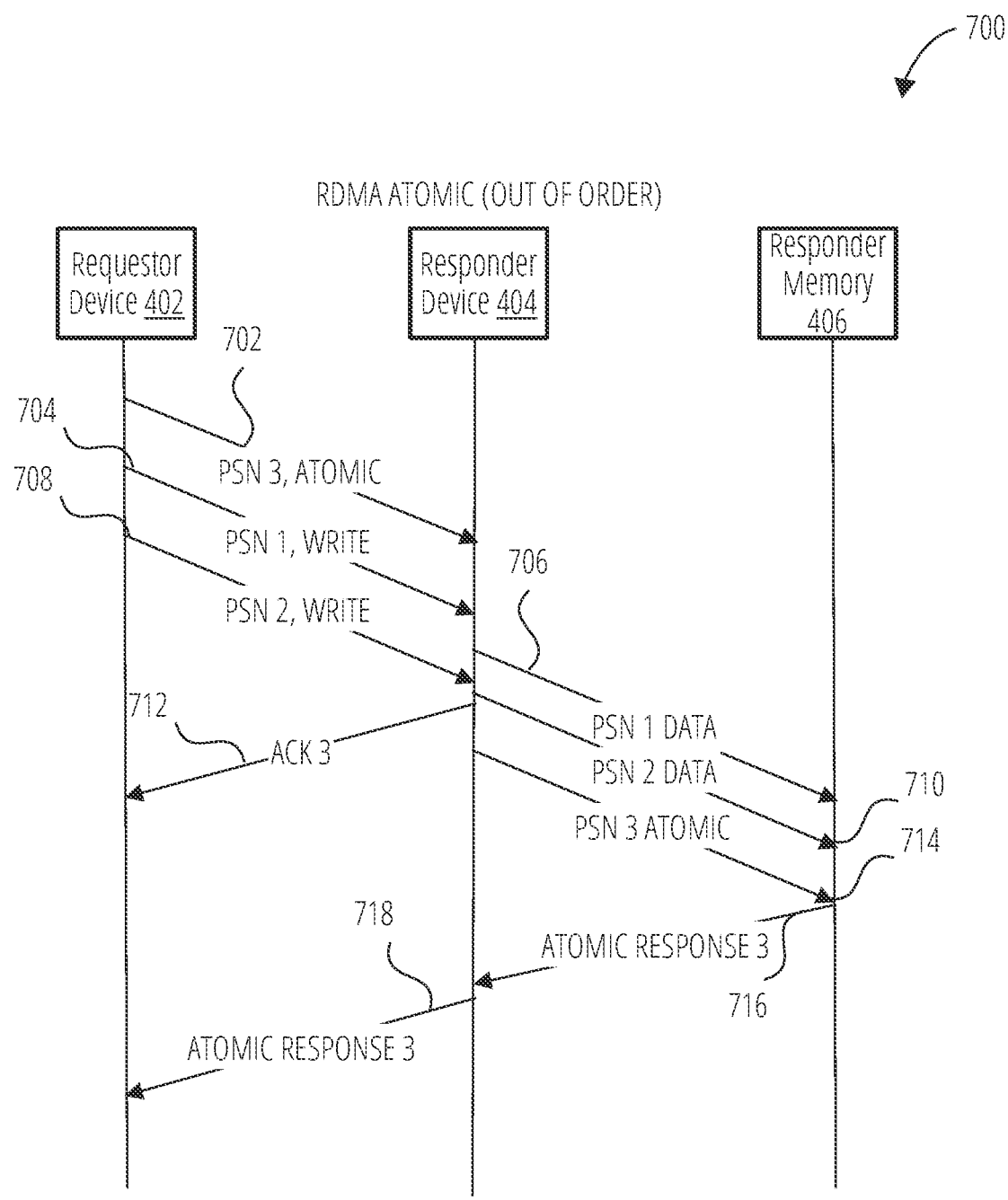
FIG. 7 is a sequence diagram of a packet sequence in which an RDMA ATOMIC request arrives out of order, according to at least one embodiment.

FIG. 7 is a sequence diagram of a packet sequence 700 in which an RDMA ATOMIC request 702 arrives out of order, according to at least one embodiment. The packet sequence 700 shows the data flow between the requestor device 402, the responder device 404, and the responder memory 406. The requestor device 402 sends all packets in the correct order, but the packets may not necessarily arrive in order, as illustrated in FIG. 5. As illustrated, the responder device 404 receives the RDMA ATOMIC request 702 to the responder device 404. The RDMA ATOMIC request 702 includes a PSN of 3, indicating that the RDMA ATOMIC request 702 is received out of order. Upon the arrival of the RDMA ATOMIC request 702, the responder device 404 does not send an ATOMIC request to the responder memory 406 until the first and second packets are received. The responder device 404 does not reject the RDMA ATOMIC request 702 even though it arrives out of order.

Subsequently, the responder device 404 receives an RDMA WRITE request 704 (labeled PSN 1, WRITE). The RDMA WRITE request 704 includes first packet data (PSN 1 data) and a PSN of 1. Upon the arrival of the RDMA WRITE request 704, the responder device 404 can send the first packet data (PSN 1 data) to the responder memory 406 (operation 706).

Subsequently, the responder device 404 receives an RDMA WRITE request 708 (labeled PSN 2, WRITE). The RDMA WRITE request 708 includes second packet data (PSN 2 data) and a PSN of 2. Upon the arrival of the RDMA WRITE request 708, the responder device 404 can send the second packet data (PSN 2 data) to the responder memory 406 (operation 710). The responder device 404 can determine that all packets of a message, containing the three packets, have been received. At this point, the responder device 404 can send an acknowledgment (ACK) 712 (ACK 3) of the RDMA ATOMIC request 702 back to the requestor device 402 instead of at the point of arrival of the RDMA ATOMIC request 702 since the RDMA ATOMIC request 702 arrived out of order. After the first and second packet data have been sent to the responder memory 406, the responder device 404 can send an ATOMIC request 714 to the responder memory 406. The responder memory 406 sends an ATOMIC response 716 back to the responder device 404 in response to the ATOMIC request 714. The responder device 404 sends an ATOMIC response 718 back to the requestor device 402.

Figure 8:
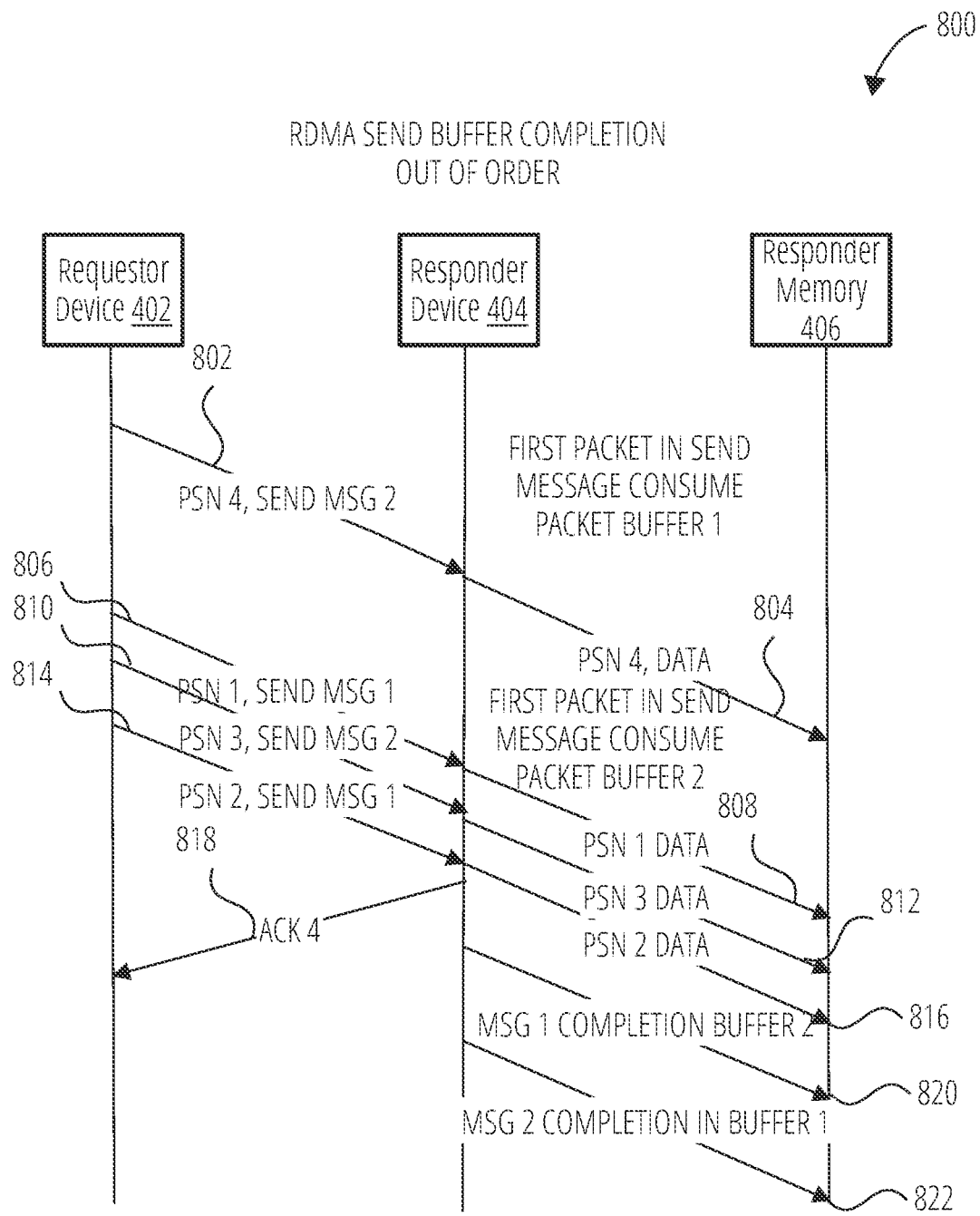
FIG. 8 is a sequence diagram of a packet sequence in which an RDMA SEND buffer completion message arrives out of order, according to at least one embodiment.

FIG. 8 is a sequence diagram of a packet sequence 800 in which an RDMA SEND buffer completion message arrives out of order, according to at least one embodiment. The packet sequence 800 shows the data flow between the requestor device 402, the responder device 404, and the responder memory 406. The requestor device 402 sends all packets in the correct order, but the packets may not necessarily arrive in order, as illustrated in FIG. 8. As illustrated, the responder device 404 receives a fourth packet 802 of a second RDMA SEND buffer completion message (labeled PSN 4, SEND MSG 2) to the responder device 404. The fourth packet 802 includes a PSN of 4, indicating that the fourth packet 802 of the second RDMA SEND buffer completion message is received out of order. Upon the arrival of the fourth packet 802, the responder device 404 does not send an acknowledgment of the second RDMA SEND buffer completion message until the first, second, and third packets are received. The responder device 404 does not reject the fourth packet 802, even though it arrives out of order. The responder device 404 can send packet data (PSN 4 data) of the fourth packet 802 to the responder memory 406 (operation 804). Since this is the first packet received in the second RDMA SEND buffer completion message, it consumes the packet in a first buffer (buffer 1).

Subsequently, the responder device 404 receives a first packet 806 of a first RDMA SEND buffer completion message (labeled PSN 1, SEND MSG 1). The first packet 806 includes first packet data (PSN 1 data) and a PSN of 1. Upon the arrival of the first packet 806, the responder device 404 can send the first packet data (PSN 1 data) to the responder memory 406 (operation 808). Since this is the first packet in the first RDMA SEND buffer completion message, it consumes the packet in a second buffer (buffer 2).

Subsequently, the responder device 404 receives a third packet 810 of the second RDMA SEND buffer completion message (labeled PSN 3, SEND MSG 2). The third packet 810 includes third packet data (PSN 3 data) and a PSN of 3. Upon the arrival of the third packet 810, the responder device 404 can send the third packet data (PSN 3 data) to the responder memory 406 (operation 812). Since this is another packet in the second RDMA SEND buffer completion message, it consumes the packet in the first buffer (buffer 1).

Subsequently, the responder device 404 receives a second packet 814 of the first RDMA SEND buffer completion message (labeled PSN 2, SEND MSG 1). The second packet 814 includes second packet data (PSN 2 data) and a PSN of 2. Upon the arrival of the second packet 814, the responder device 404 can send the second packet data (PSN 2 data) to the responder memory 406 (operation 816). Since this is another packet in the first RDMA SEND buffer completion message, it consumes the packet in the second buffer (buffer 2).

The responder device 404 can determine that all packets of the messages, containing the four packets, have been received. At this point, the responder device 404 can send an acknowledgment (ACK) 818 (ACK 4) of the fourth packet 802 back to the requestor device 402 instead of at the point of arrival of the fourth packet 802 since the fourth packet 802 arrived out of order. After the packet data of the first RDMA SEND buffer completion message have been sent, the responder device 404 can send a first message completion buffer message 820 regarding the second buffer to the responder memory 406. After the packet data of the second RDMA SEND buffer completion message has been sent, the responder device 404 can send a second message completion buffer message 822 regarding the first buffer to the responder memory 406. In this manner, the buffer completion messages are handled in order despite the fourth packet 802 being received out of order.

Figure 9A:
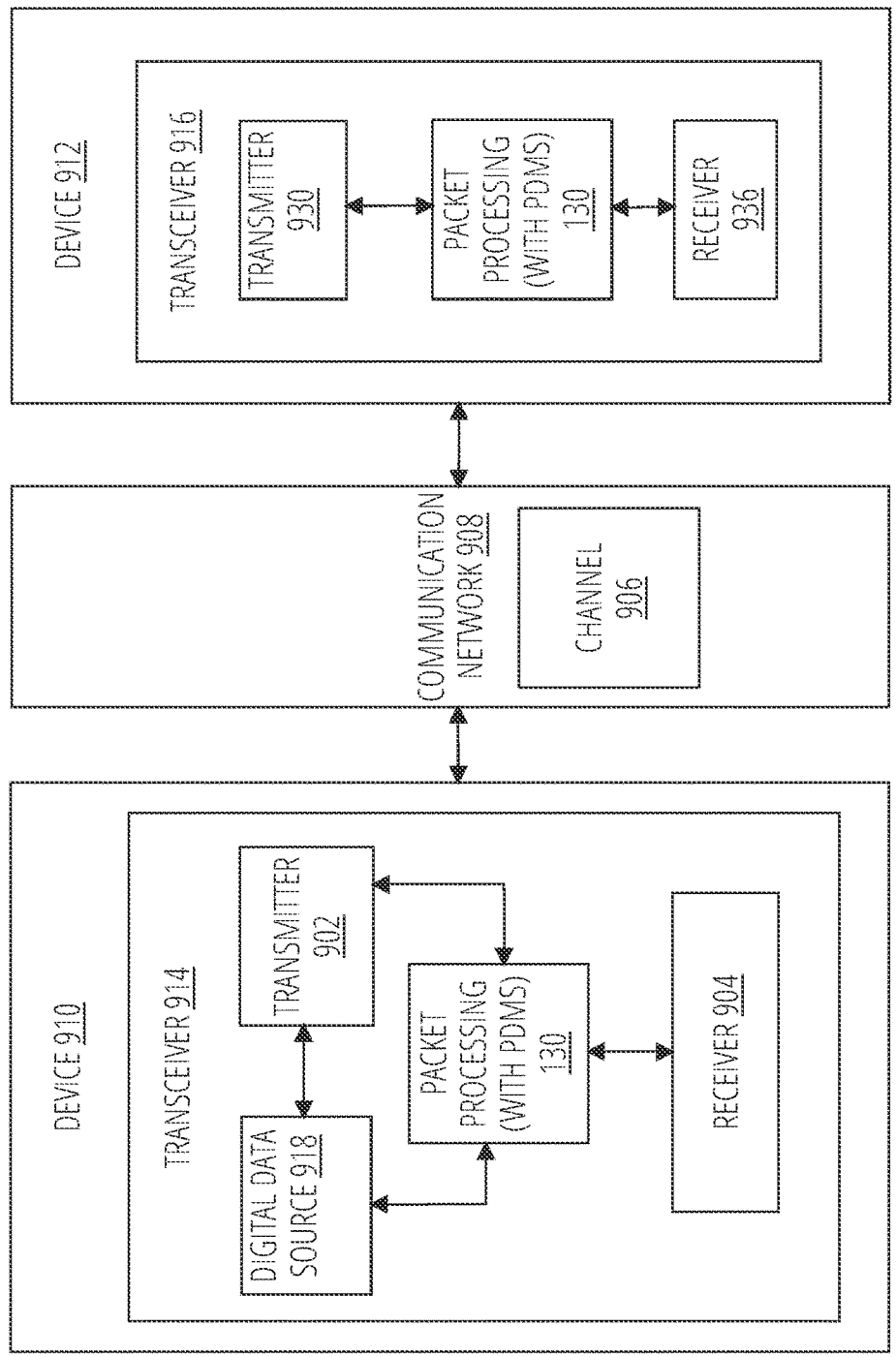
FIG. 9A illustrates an example communication system with packet processing with payload direct memory storing (PDMS), in accordance with at least some embodiments.

FIG. 9A illustrates an example communication system 900 with packet processing with PDMS 130, in accordance with at least some embodiments. The communication system 900 includes a device 910, a communication network 908 including a communication channel 906, and a device 912. In at least one embodiment, the devices 910 and 912 are integrated circuits of a Personal Computer (PC), a laptop, a tablet, a smartphone, a server, a collection of servers, or the like. In some embodiments, the devices 910 and 912 may correspond to any appropriate type of device that communicates with other devices also connected to a common type of communication network 908. According to embodiments, the transmitters 902 and 920 of devices 910 or 912 may correspond to transmitters of a GPU, a switch (e.g., a high-speed network switch), a network adapter, a CPU, a data processing unit (DPU), etc.

Examples of the communication network 908 that may be used to connect the devices 910 and 912 include wires, conductive traces, bumps, terminals, or the like. In one example, the communication network 908 is a network that enables data transmission between the devices 910 and 912 using data signals (e.g., digital, optical, wireless signals), clock signals, or both.

The device 910 includes a transceiver 914 for sending and receiving signals, for example, data signals. The data signals may be digital or optical signals modulated with data or other suitable signals for carrying data.

The transceiver 914 may include a digital data source 918, a transmitter 902, a receiver 904, and packet processing 130 that controls the transceiver 914. The packet processing 130 includes the PDMS features described above with respect to FIG. 1 to FIG. 8. The digital data source 918 may include suitable hardware and/or software for outputting data in a digital format (e.g., in binary code and/or thermometer code). The digital data output by the digital data source 918 may be retrieved from memory (not illustrated) or generated according to input (e.g., user input).

The transceiver 914 includes suitable software and/or hardware for receiving digital data from the digital data source 918 and outputting data signals according to the digital data for transmission over the communication network 908 to a transceiver 916 of device 912.

The receiver 904 of device 910 may include suitable hardware and/or software for receiving signals, for example, data signals from the communication network 908. For example, the receiver 904 may include components for receiving processing signals to extract the data for storing in a memory. In at least one embodiment, the transceiver 916 includes transmitter 920 and receiver 932. The transceiver 916 receives an incoming signal and samples the incoming signal to generate samples, such as using an analog-to-digital converter (ADC). The ADC can be controlled by a clock-recovery circuit (or clock recovery block) in a closed-loop tracking scheme. The clock-recovery circuit can include a controlled oscillator, such as a voltage-controlled oscillator (VCO) or a digitally-controlled oscillator (DCO) that controls the sampling of the subsequent data by the ADC.

The packet processing 130 may comprise software, hardware, or a combination thereof. For example, the packet processing 130 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the packet processing 130 may comprise hardware, such as an ASIC. Other non-limiting examples of the packet processing 130 include an Integrated Circuit (IC) chip, a CPU, A GPU, a DPU, a microprocessor, an FPGA, a collection of logic gates or transistors, resistors, capacitors, inductors, diodes, or the like. Some or all of the packet processing 130 may be provided on a Printed Circuit Board (PCB) or collection of PCBs. It should be appreciated that any appropriate type of electrical component or collection of electrical components may be suitable for inclusion in the packet processing 130. The packet processing 130 may send and/or receive signals to and/or from other elements of the transceiver 914 to control the overall operation of the transceiver 914.

The transceiver 914 or selected elements of the transceiver 914 may take the form of a pluggable card or controller for the device 910. For example, the transceiver 914 or selected elements of the transceiver 914 may be implemented on a network interface card (NIC).

The device 912 may include a transceiver 916 for sending and receiving signals, for example, data signals over a channel 906 of the communication network 908. The same or similar structure of the transceiver 914 may be applied to transceiver 916, and thus, the structure of transceiver 916 is not described separately.

Although not explicitly shown, it should be appreciated that devices 910 and 912 and the transceiver 914 and transceiver 916 may include other processing devices, storage devices, and/or communication interfaces generally associated with computing tasks, such as sending and receiving data.

Figure 9B:
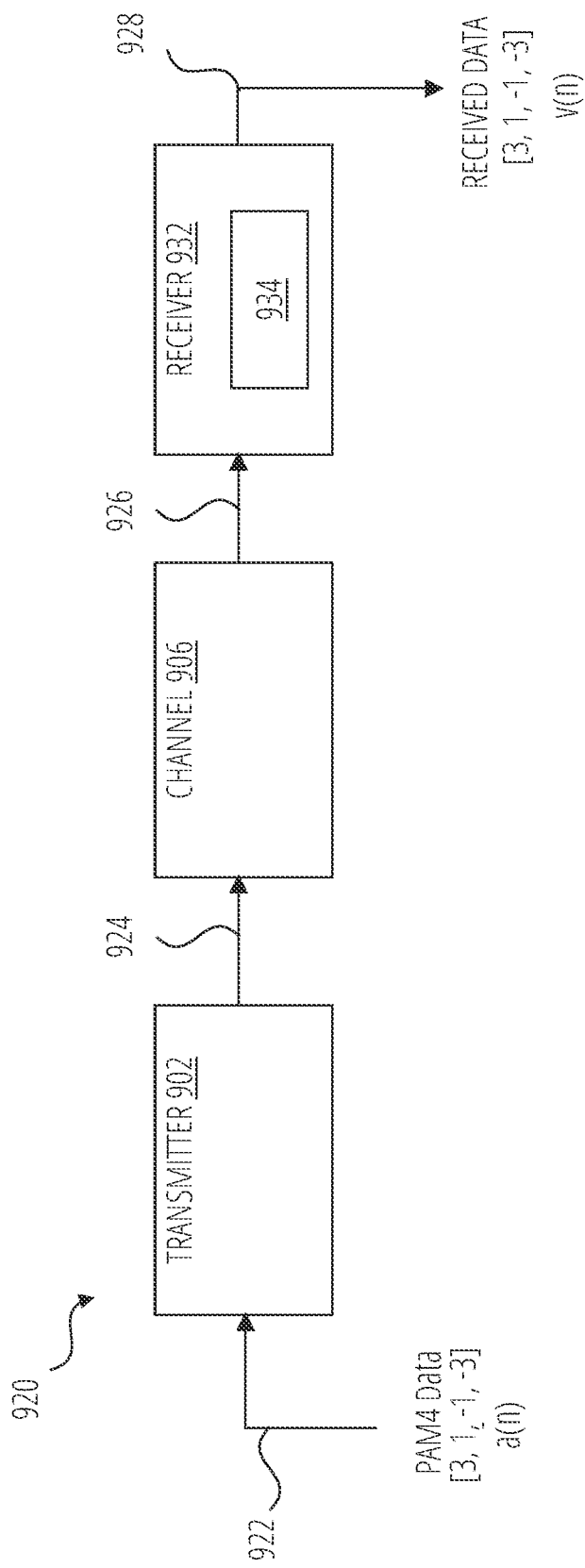
FIG. 9B illustrates a block diagram of an example communication system employing a PDMS mechanism, according to at least one embodiment.

FIG. 9B illustrates a block diagram of an example communication system 922 employing a PDMS mechanism 934, according to at least one embodiment. In the example shown in FIG. 9B, a Pulse Amplitude Modulation level-4 (PAM4) modulation scheme is employed with respect to the transmission of a signal (e.g., digitally encoded data) from a transmitter (TX) 902 to a receiver (RX) 932 via a communication channel 906 (e.g., a transmission medium). In this example, the transmitter 902 receives an input data 924 (i.e., the input data at time n is represented as "a(n)"), which is modulated in accordance with a modulation scheme (e.g., PAM4) and sends the signal 926 a(n) including a set of data symbols (e.g., symbols −3, −1, 1, 3, where the symbols represent coded binary data). It is noted that while the use of the PAM4 modulation scheme is described herein by way of example, other data modulation schemes can be used in accordance with embodiments of the present disclosure, including for example, a non-return-to-zero (NRZ) modulation scheme, PAM7, PAM8, PAM16, etc. For example, for an NRZ-based system, the transmitted data symbols consist of symbols −1 and 1, with each symbol value representing a binary bit. This is also known as a PAM level-2 or PAM2 system as there are 2 unique values of transmitted symbols. Typically, a binary bit 0 is encoded as −1, and a bit 1 is encoded as 1 as the PAM2 values.

In the example shown, the PAM4 modulation scheme uses four (4) unique values of transmitted symbols to achieve higher efficiency and performance. The four levels are denoted by symbol values −3, −1, 1, 3, with each symbol representing a corresponding unique combination of binary bits (e.g., 00, 01, 10, 11).

The communication channel 906 is a destructive medium in that the channel acts as a low pass filter that attenuates higher frequencies more than it attenuates lower frequencies, introduces inter-symbol interference (ISI) and noise from cross talk, power supplies, Electromagnetic Interference (EMI), or other sources. The communication channel 906 can be over serial links (e.g., a cable, PCB traces, copper cables, optical fibers, or the like), read channels for data storage (e.g., hard disk, flash solid-state drives (SSDs), high-speed serial links, deep space satellite communication channels, applications, or the like. The receiver (RX) 932 receives an incoming signal 928 over the channel 906. The receiver 932 can include the PDMS mechanism 934. The PDMS mechanism 934 can receive and handle packets of a single transport stream out of order, as described herein. The PDMS mechanism 934 can be similar to the PDMS mechanisms described above with respect to FIG. 1 to FIG. 8. The receiver 932 can output a received signal 930, "v(n)," including the set of data symbols (e.g., symbols −3, −1, 1, 3, wherein the symbols represent coded binary data).

In at least one embodiment, the transmitter 902 can be part of a SerDes IC. The SerDes IC can be a transceiver that converts parallel data to serial data and vice versa. The SerDes IC can facilitate transmission between two devices over serial streams, reducing the number of data paths, wires/traces, terminals, etc. The receiver 932 can be part of a SerDes IC. The SerDes IC can include a clock-recovery circuit. The clock-recovery circuit can be coupled to an ADC and an equalization block.

Figure 10:
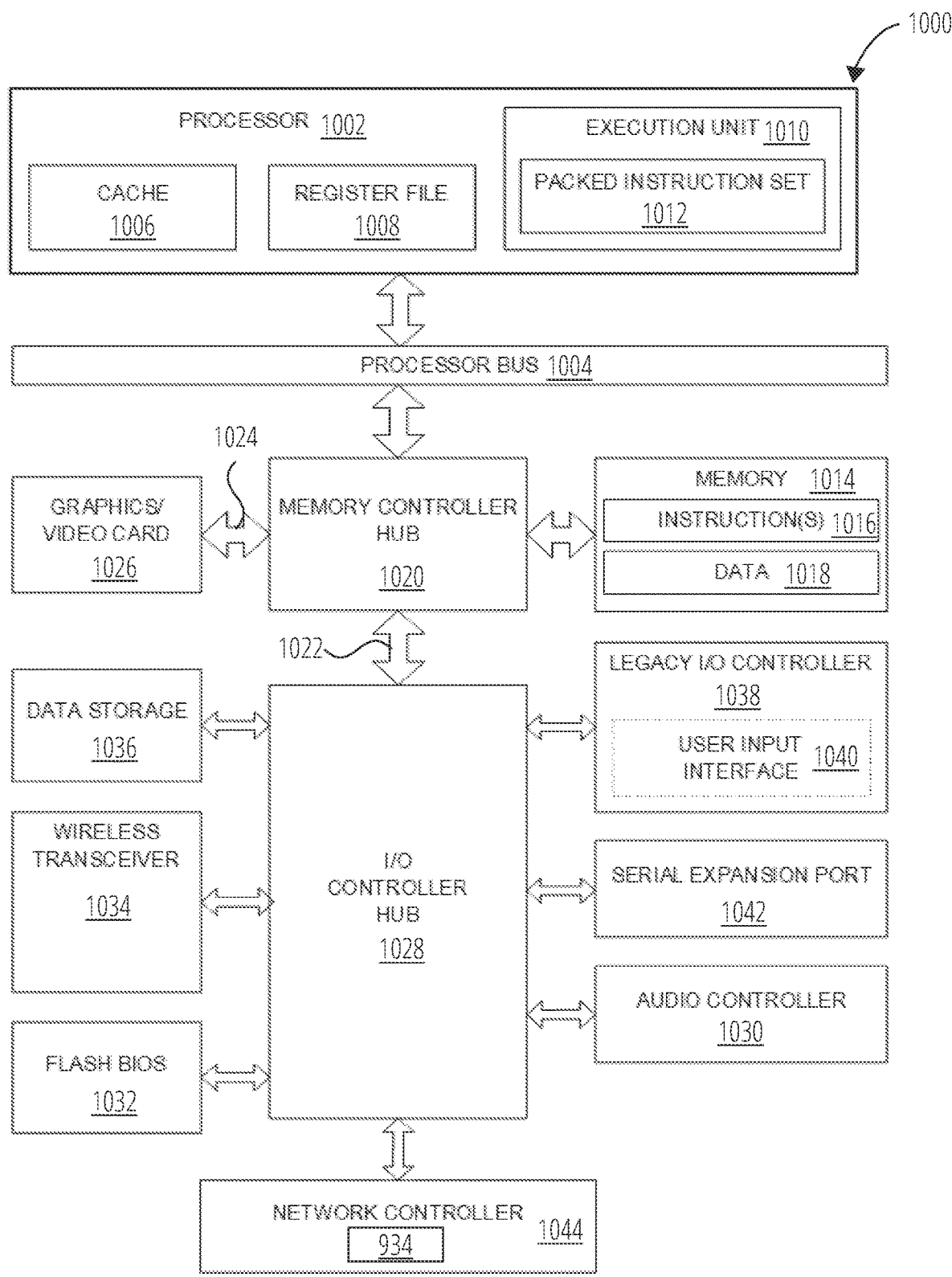
FIG. 10 illustrates an example computer system, including a network controller with a PDMS mechanism, in accordance with at least some embodiments.

FIG. 10 illustrates an example computer system 1000, including a network controller 1042 with a PDMS mechanism 934, in accordance with at least some embodiments. The PDMS mechanism 934 can receive and handle packets of a single transport stream out of order, as described herein. In at least one embodiment, computer system 1000 may be a system with interconnected devices and components, a System on Chip (SoC), or some combination. In at least one embodiment, computer system 1000 is formed with a processor 1002 that may include execution units to execute an instruction. In at least one embodiment, computer system 1000 may include, without limitation, a component, such as a processor 1002, to employ execution units including logic to perform algorithms for processing data. In at least one embodiment, computer system 1000 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1000 may execute a version of WINDOWS' operating system available from Microsoft Corporation of Redmond, Wash., although other operating systems (UNIX and Linux, for example), embedded software, and/or graphical user interfaces, may also be used.

In at least one embodiment, computer system 1000 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 1000 may be used in devices such as graphics processing units (GPUs), network adapters, central processing units, and network devices such as switches (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 1000 may include, without limitation, processor 1002 that may include, without limitation, one or more execution units 807 that may be configured to execute a Compute Unified Device Architecture ("CUDA") (CUDA® is developed by NVIDIA Corporation of Santa Clara, California) program. In at least one embodiment, a CUDA program is at least a portion of a software application written in a CUDA programming language. In at least one embodiment, computer system 1000 is a single processor desktop or server system. In at least one embodiment, computer system 1000 may be a multiprocessor system. In at least one embodiment, processor 1002 may include, without limitation, a complex instruction set computer (CISC) microprocessor, a reduced instruction set computer (RISC) microprocessor, a Very Long Instruction Word (VLIW) microprocessor, and a processor implementing a combination of instruction sets, or any other processor device, such as a digital signal processor, for example. In at least one embodiment, processor 1002 may be coupled to a processor bus 1002 that may transmit data signals between processor 1002 and other components in computer system 1000.

In at least one embodiment, processor 1002 may include, without limitation, a Level 1 ("L1") internal cache memory ("cache") 1004. In at least one embodiment, processor 1002 may have a single internal cache or multiple levels of internal cache. In at least one embodiment, cache memory may reside external to processor 1002. In at least one embodiment, processor 1002 may also include a combination of both internal and external caches. In at least one embodiment, a register file 1006 may store different types of data in various registers, including integer registers, floating point registers, status registers, instruction pointer registers, or the like.

In at least one embodiment, execution unit 1008, including, without limitation, logic to perform integer and floating point operations, also resides in processor 1002. Processor 1002 may also include a microcode ("ucode") read-only memory ("ROM") that stores microcode for certain macro instructions. In at least one embodiment, execution unit 1008 may include logic to handle a packed instruction set 1010. In at least one embodiment, by including packed instruction set 1010 in an instruction set of a general-purpose processor 1002, along with associated circuitry to execute instructions, operations used by many multimedia applications may be performed using packed data in a general-purpose processor 1002. In at least one embodiment, many multimedia applications may be accelerated and executed more efficiently by using the full width of a processor's data bus for performing operations on packed data, which may eliminate the need to transfer smaller units of data across a processor's data bus to perform one or more operations one data element at a time.

In at least one embodiment, execution unit 1008 may also be used in microcontrollers, embedded processors, graphics devices, DSPs, and other types of logic circuits. In at least one embodiment, computer system 1000 may include, without limitation, a memory 1012. In at least one embodiment, memory 1012 may be implemented as a Dynamic Random Access Memory (DRAM) device, a Static Random Access Memory (SRAM) device, a flash memory device, or other memory devices. Memory 1012 may store instruction(s) 1014 and/or data 1016 represented by data signals that may be executed by processor 1002.

In at least one embodiment, a system logic chip may be coupled to a processor bus 1002 and memory 1012. In at least one embodiment, the system logic chip may include, without limitation, a memory controller hub ("MCH") 1018, and processor 1002 may communicate with MCH 1018 via processor bus 1002. In at least one embodiment, MCH 1018 may provide a high bandwidth memory path to memory 1012 for instruction and data storage and for storage of graphics commands, data, and textures. In at least one embodiment, MCH 1018 may direct data signals between processor 1002, memory 1012, and other components in computer system 1000 and may bridge data signals between processor bus 1002, memory 1012, and a system I/O 1020. In at least one embodiment, a system logic chip may provide a graphics port for coupling to a graphics controller. In at least one embodiment, MCH 1018 may be coupled to memory 1012 through high bandwidth memory path, and graphics/video card 1024 may be coupled to MCH 1018 through an Accelerated Graphics Port ("AGP") interconnect 1022.

In at least one embodiment, computer system 1000 may use system I/O 1020, which can be a proprietary hub interface bus to couple MCH 1018 to I/O controller hub ("ICH") 1026. In at least one embodiment, ICH 1026 may provide direct connections to some I/O devices via a local I/O bus. In at least one embodiment, a local I/O bus may include, without limitation, a high-speed I/O bus for connecting peripherals to memory 1012, a chipset, and processor 1002. Examples may include, without limitation, an audio controller 1028, a firmware hub ("flash BIOS") 1030, a wireless transceiver 1032, a data storage 1034, a legacy I/O controller 1036 containing a user input interface 1038, a keyboard interface, a serial expansion port 1040, such as a USB port, and a network controller 1042, including the PDMS mechanism 934 as described herein. Data storage 1034 may comprise a hard disk drive, a floppy disk drive, a CD-ROM device, a flash memory device, or other mass storage devices.

In at least one embodiment, FIG. 10 illustrates a computer system 1000, which includes interconnected hardware devices or "chips." In at least one embodiment, FIG. 10 may illustrate an example SoC. In at least one embodiment, devices illustrated in FIG. 10 may be interconnected with proprietary interconnects, standardized interconnects (e.g., Peripheral Component Interconnect Express (PCIe), or some combination thereof. In at least one embodiment, one or more components of computer system 1000 are interconnected using compute express link ("CXL") interconnects.

Other variations are within the spirit of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more individual non-transitory storage media of multiple non-transitory computer-readable storage media lacks all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples or exemplary language (e.g., "such as") provided herein is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulates and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As a non-limiting example, a "processor" may be a network device. A "computing platform" may comprise one or more processors. As used herein, "software" processes may include, for example, software and/or hardware entities that perform work over time, such as tasks, threads, and intelligent agents. Also, each process may refer to multiple processes for continuously or intermittently carrying out instructions in sequence or parallel. In at least one embodiment, the terms "system" and "method" are used herein interchangeably insofar as the system may embody one or more methods, and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways, such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface, or an inter-process communication mechanism.

Although descriptions herein set forth example embodiments of described techniques, other architectures may be used to implement described functionality and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method of operating a first device, the method comprising:
receiving a first packet of a message in a single remote direct memory access (RDMA) transport stream from a second device over a first route between the first device and the second device, the first packet comprising a first packet number and first location information;
storing first packet data of the first packet at a first location according to the first location information;

receiving a second packet of the message over a second route between the first device and the second device, the second packet comprising a second packet number and second location information, wherein the first route and the second route are different, wherein the second packet number indicates that the first packet is received out of order relative to the second packet; and storing second packet data of the second packet at a second location according to the second location information, wherein the first location and the second location store the first packet data and the second packet data in order.

2. The method of claim 1, wherein the first packet number is a higher packet sequential number (PSN) than the second packet number.

3. The method of claim 1, further comprising providing an indication that the message has arrived in response to determining that all packets of the message have arrived, wherein the message is at least one of an RDMA send request, an RDMA write request, an RDMA read request, or an RDMA atomic request.

4. The method of claim 1, wherein the first location is a first memory location in a memory, wherein the second location is a second memory location in the memory.

5. The method of claim 1, wherein the first location and the second location are locations in a data buffer.

6. The method of claim 1, wherein the message is an RDMA send request, wherein the first packet comprises a header field with the first location information, wherein the first location information identifies an offset of the first packet within the message.

7. The method of claim 1, further comprising:
determining that all packets of the message have arrived; and
providing an indication that the message has arrived in response to determining that all packets of the message have arrived.

8. The method of claim 7, further comprising:
maintaining a list of packets of the message that have successfully arrived.

9. The method of claim 1, further comprising:
receiving a third packet of the message from the second device, the third packet comprising a first packet sequential number (PSN) of the message, wherein the first PSN is to identify a message context of the message, wherein the third packet is received before the first packet and the second packet.

10. The method of claim 9, further comprising:
selecting a work queue element (WQE) in a data buffer for the message in response to receiving the third packet, wherein the message is for an RDMA send request, wherein the first location information identifies a first offset of the first packet data within the message, and wherein the second location information identifies a second offset of the second packet data within the message;
scattering the first packet data to the data buffer according to the first offset;
scattering the second packet data to the data buffer according to the second offset; and
updating a completion status of a completion queue entry (CQE) associated with the WQE.

11. A method of operating a first device, the method comprising:
receiving a first packet of a message in a single remote direct memory access (RDMA) transport stream from a second device, the first packet comprising a first packet number and first location information;
storing first packet data of the first packet at a first location according to the first location information;
receiving a second packet of the message, the second packet comprising a second packet number and second location information, wherein the second packet number indicates that the first packet is received out of order relative to the second packet;
storing second packet data of the second packet at a second location according to the second location information, wherein the first location and the second location store the first packet data and the second packet data in order; and
receiving a third packet of the message from the second device, the third packet comprising a first message identifier to identify a message context of the message, wherein the third packet is received before the first packet and the second packet.

12. A first device comprising:
a memory or data buffer to store packet data;
a processing device coupled to the memory or data buffer, the processing device to:
receive and accept packets of a message in a single remote direct memory access (RDMA) transport stream regardless of an order of receipt of the packets; and
store packet data of the packets in order in the memory or data buffer using offset information included in the packets, wherein the processing device comprises a transport layer, wherein the transport layer is to provide an indication that the message has arrived to a higher layer than the transport layer, in response to determining that all packets of the message have arrived.

13. The first device of claim 12, wherein the first device is a network adapter.

14. The first device of claim 12, wherein the first device is a network interface card (NIC).

15. A first device comprising:
a memory or data buffer to store packet data;
a processing device coupled to the memory or data buffer, the processing device to:
receive and accept packets of a message in a single remote direct memory access (RDMA) transport stream regardless of an order of receipt of the packets;
store packet data of the packets in order in the memory or data buffer using offset information included in the packets;
receive a first packet with a first packet sequential number (PSN) and a first offset within the message;
receive a second packet with a second PSN and a second offset within the message, wherein the first PSN is higher than the second PSN; and
store first packet data of the first packet and second packet data of the second packet in the memory or data buffer in order using the first offset and the second offset, respectively.

16. The first device of claim 15, wherein the first packet is received from a second device over a first route between the first device and the second device, wherein the second packet is received from the second device over a second route between the first device and the second device, wherein the first route and the second route are different.

17. The first device of claim 12, wherein the processing device is to:

receive a first packet with a message number (MSN) and a first offset within the message;

receive a second packet with the MSN and a second offset within the message; and store first packet data of the first packet and second packet data of the second packet in the memory or data buffer in order using the first offset and the second offset, respectively.

18. A communication system comprising:

a requestor device;

a responder device; and responder memory coupled to the responder device, wherein the responder device is to:

receive a first packet of a message in a single remote direct memory access (RDMA) transport stream from the requestor device over a first route between the requestor device and the responder device, the first packet comprising a first packet number and first location information;

store first packet data of the first packet at a first location in the responder memory according to the first location information;

receive a second packet of the message over a second route between the requestor device and the responder device, the second packet comprising a second packet number and second location information, wherein the first route and the second route are different, wherein the second packet number indicates that the first packet is received out of order relative to the second packet; and store second packet data of the second packet at a second location in the responder memory according to the second location information, wherein the first location and the second location store the first packet data and the second packet data in order.

19. The communication system of claim 18, wherein the first packet number is a higher packet sequential number (PSN) than the second packet number.

20. The communication system of claim 18, wherein the responder device is to provide an indication that the message has arrived in response to determining that all packets of the message have arrived, wherein the message is at least one of an RDMA send request, an RDMA write request, an RDMA read request, or an RDMA atomic request.

21. The communication system of claim 18, wherein the message is an RDMA send request, wherein the first packet comprises a header field with the first location information, wherein the first location information identifies an offset of the first packet within the message.

22. A method of operating a first device, the method comprising:

receiving and accepting packets of a message in a single remote direct memory access (RDMA) transport stream regardless of an order of receipt of the packets;

storing packet data of the packets in order in a memory or data buffer using offset information included in the packets;

determining that all packets of the message have arrived; and providing, by a transport layer of the first device, an indication that the message has arrived to a higher layer than the transport layer, in response to determining that all packets of the message have arrived.

23. The method of claim 22, further comprising:

receiving a first packet with a first packet sequential number (PSN) and a first offset within the message;

receiving a second packet with a second PSN and a second offset within the message, wherein the first PSN is higher than the second PSN; and storing first packet data of the first packet and second packet data of the second packet in the memory or data buffer in order using the first offset and the second offset, respectively.

24. The method of claim 23, wherein the first packet is received from a second device over a first route between the first device and the second device, wherein the second packet is received from the second device over a second route between the first device and the second device, wherein the first route and the second route are different.

25. The method of claim 11, wherein the first message identifier is a first packet sequential number (PSN) of the message, wherein the first PSN is to identify the message context of the message.

* * * * *